US007400610B2

(12) United States Patent
Malkemes et al.

(10) Patent No.: US 7,400,610 B2
(45) Date of Patent: Jul. 15, 2008

(54) BROADCAST RETRANSMITTER, METHOD OF RETRANSMITTING A BROADCAST AND SYSTEM EMPLOYING THE SAME

(75) Inventors: Robert C. Malkemes, Bricktown, NJ (US); Edwin A. Muth, Aberdeen, NJ (US); Denis P. Orlando, Freehold, NJ (US); Jie Song, Marlboro, NJ (US)

(73) Assignee: Agere Systems Inc., Allentown, PA (US)

( * ) Notice: Subject to any disclaimer, the term of this patent is extended or adjusted under 35 U.S.C. 154(b) by 542 days.

(21) Appl. No.: 10/810,418

(22) Filed: Mar. 26, 2004

(65) Prior Publication Data

US 2005/0213526 A1 Sep. 29, 2005

(51) Int. Cl.
*H04Q 7/20* (2006.01)

(52) U.S. Cl. .................. 370/338; 370/310; 370/328; 370/349

(58) Field of Classification Search ................ 370/338, 370/328, 311, 349, 329, 445, 346, 310; 455/3.01, 455/3.06, 455, 466, 556.1, 557; 398/128, 398/151, 127
See application file for complete search history.

(56) References Cited

U.S. PATENT DOCUMENTS 6,243,427 B1 *  6/2001  Stockton et al. ............. 375/308

| 6,370,153 | B1 * | 4/2002 | Eng ............................. 370/438 |
| 6,633,547 | B1 * | 10/2003 | Akatsu et al. ............... 370/255 |
| 6,728,824 | B1 * | 4/2004 | Chen .............................. 711/1 |
| 7,123,875 | B1 * | 10/2006 | Marko et al. ................ 455/3.02 |
| 2002/0183059 | A1 * | 12/2002 | Noreen et al. ............... 455/427 |
| 2004/0029525 | A1 * | 2/2004 | Vertelney ................... 455/3.03 |
| 2004/0038692 | A1 * | 2/2004 | Muzaffar .................... 455/502 |
| 2004/0120474 | A1 * | 6/2004 | Lopponen et al. ........ 379/88.17 |
| 2005/0097053 | A1 * | 5/2005 | Aaltonen et al. .............. 705/51 |
| 2006/0136549 | A1 * | 6/2006 | Carro ........................... 709/203 |

OTHER PUBLICATIONS

Lars Schmitt, et al., "Maximum Ratio Combining of Correlated Diversity Branches with Imperfect Channel State Information and Colored Noise" Proc. 8th IEEE International Symposium on Spread Spectrum Techniques and Applications (ISSSTA), Sydney, Australia, Aug. 2004.

* cited by examiner

*Primary Examiner*—Jean A Gelin

(57) ABSTRACT

The present invention provides a broadcast retransmitter for use with a wireless local area network (WLAN). In one embodiment, the broadcast retransmitter includes a gateway configured to format a bitstream received from a broadcast receiver for delivery to a wireless access point (WAP) of the WLAN and subsequent conversion by the WAP into a wireless transmission over the WLAN to make the bitstream available for reception by a client of the WLAN.

20 Claims, 4 Drawing Sheets

BROADCAST RETRANSMITTER, METHOD OF RETRANSMITTING A BROADCAST AND SYSTEM EMPLOYING THE SAME

TECHNICAL FIELD OF THE INVENTION

The present invention is directed, in general, to wireless communications and, more specifically, to a retransmission system, method of retransmitting a broadcast and network employing the same.

BACKGROUND OF THE INVENTION

Satellite radio is a recent addition to prior forms of broadcast radio. It promises to overcome several perceived limitations of prior broadcast formats. All such prior forms are "terrestrial," meaning that their broadcast signals originate from Earth-bound transmitters. As a result, they have a relatively short range, perhaps a few hundred miles for stations on the AM and FM bands. Therefore, mobile broadcast recipients are often challenged with constant channel surfing as settled-upon stations slowly fade and new ones slowly come into range. Even within range, radio signals may be attenuated or distorted by natural or man-made obstacles, such as mountains or buildings. Radio signals may even wax or wane in power or fidelity depending upon the time of day or the weather. This only serves to compound the motorists' frustration.

Additionally, broadcast radio is largely locally originated. This constrains the potential audience that can listen to a particular station and thus the money advertisers are willing to pay for programming and on-air talent. While the trend is decidedly toward large networks of commonly-owned radio stations with centralized programming and higher-paid talent, time and regulatory change will be required to complete the consolidation.

Finally, the Federal Communications Commission (FCC) defined the broadcast radio spectrum decades ago, long before digital transmission and even digital fidelity were realizable. The result is that the bandwidth allocated to an FM radio station is not adequate for hi-fidelity music, and the bandwidth allocated to an AM radio station is barely adequate for voice.

Satellite radio promises to change all of this. A user who has a satellite radio receiver in his vehicle can tune into any one of a hundred or more nationwide stations with the promise of compact disc quality digital sound. By virtue of satellite redundancy, transmission from overhead and transcontinental coverage substantial provides immunity to service interruption. Satellite technology would appear to do for radio what cable and satellite technologies have done for television.

The reception of satellite radio broadcasts are not limited to mobile applications. Home or office receptions of such broadcasts are also desirable. However, such receptions present challenges that impact their fidelity and cost in that satellite signals do not readily propagate indoors due to their limited power. Additionally, a satellite receiver is typically required for each listening station making broadcast distribution costly for multiple listening stations.

Accordingly, what is needed in the art is a more effective and less costly way to provide a broadcast reception to a plurality of listeners.

SUMMARY OF THE INVENTION

To address the above-discussed deficiencies of the prior art, the present invention provides a broadcast retransmitter for use with a wireless local area network (WLAN). In one embodiment, the broadcast retransmitter includes a gateway configured to format a bitstream received from a broadcast receiver for delivery to a wireless access point (WAP) of the WLAN and subsequent conversion by the WAP into a wireless transmission over the WLAN to make the bitstream available for reception by a client of the WLAN.

In another aspect, the present invention provides a method of retransmitting a broadcast over a wireless local area network (WLAN). The method includes formatting a bitstream received from a broadcast receiver containing the broadcast, delivering the bitstream to a wireless access point of the WLAN, and converting the bitstream into a wireless transmission over the WLAN to make the bitstream available for reception by a client of the WLAN.

The present invention also provides, in yet another aspect, a broadcast retransmission system. The broadcast retransmission system includes a broadcast receiver that receives a broadcast and generates a bitstream containing the broadcast. The broadcast retransmission system also includes a gateway, coupled to the broadcast receiver, that generates a formatted bitstream for retransmission by a wireless access point, coupled to the gateway, that receives and converts the formatted bitstream into a wireless transmission over a wireless local area network (WLAN) to make the bitstream available for reception by a client of the WLAN.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
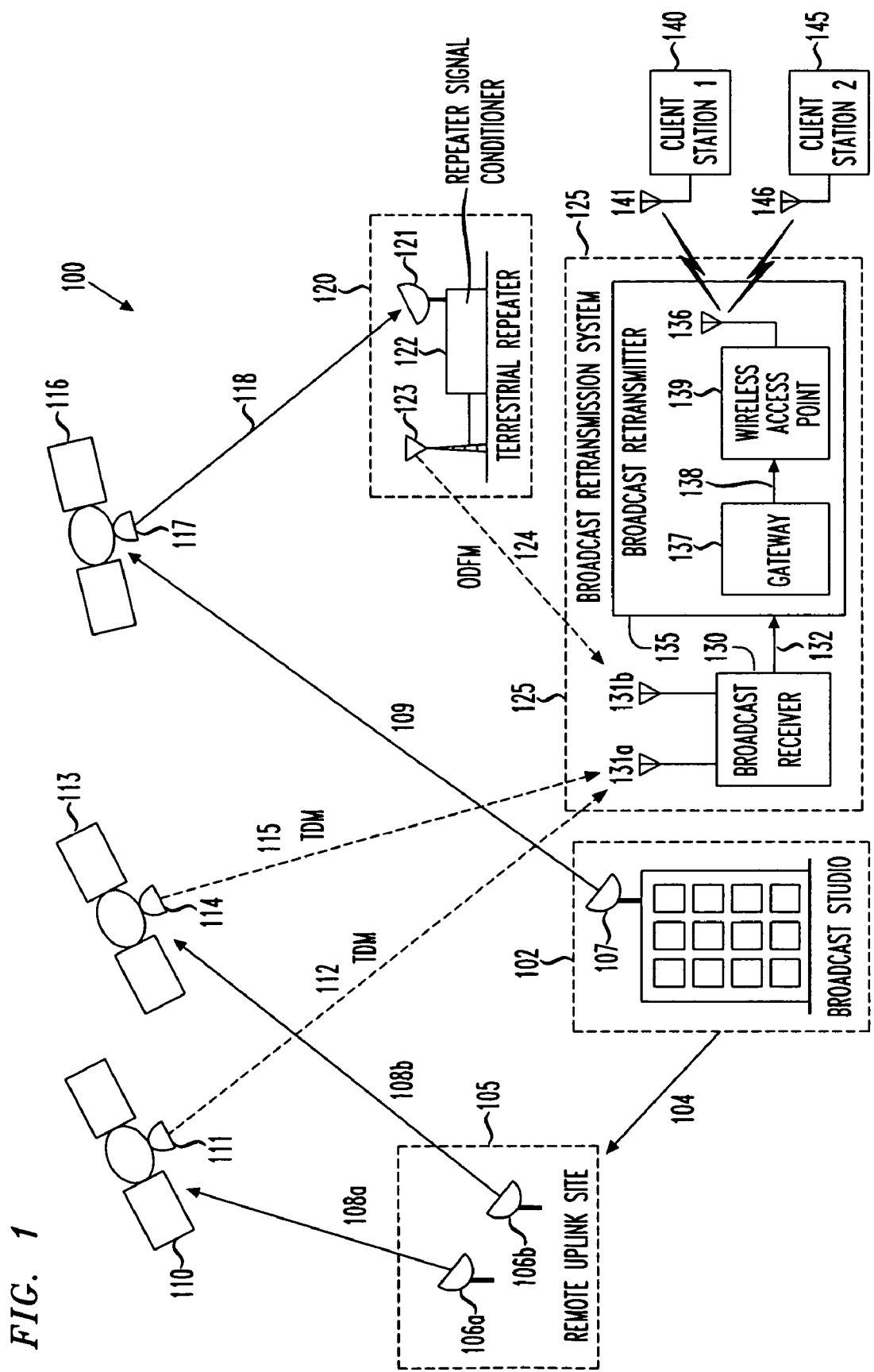
FIG. 1 illustrates a system diagram of an embodiment of a satellite digital audio radio broadcasting service (SDARS) employing a broadcast retransmission system constructed in accordance with the principles of the present invention.

Referring initially to FIG. 1, illustrated is a system diagram of an embodiment of a satellite digital audio radio broadcasting service (SDARS), generally designated 100, employing a broadcast retransmission system constructed in accordance with the principles of the present invention. The SDARS 100 includes a SDARS broadcast studio 102, a remote uplink site 105, first and second SDARS satellites 110, 113, a Very Small Aperture Terminal (VSAT) satellite 116, a terrestrial repeater 120 and a broadcast retransmission system 125 that employs first and second client stations 140, 145.

The SDARS broadcast studio 102 generates composite signals containing multiple audio and control channel signals. These signals include a SDARS broadcast to the remote uplink site 105 employing a satellite uplink signal 104 and a VSAT broadcast to the VSAT satellite 116 via a terrestrial transmission antenna 107. The remote uplink site 105 receives the satellite uplink signal 104 and includes first and second satellite uplink antennas 106a, 106b to direct the SDARS broadcast to the first and second SDARS satellites 110, 113. The first and second SDARS satellites 110, 113 include first and second SDARS satellite antennas 111, 114, respectively. The VSAT satellite 116 includes a VSAT satellite antenna 117. The terrestrial repeater 120, which is one of a plurality of terrestrial repeaters, includes a VSAT downlink antenna 121, a repeater signal conditioner 122 and a terrestrial repeater antenna 123.

The SDARS 100 operates in the S-band frequency range and provides compact disk quality audio programming to a subscriber. The SDARS broadcast provider transmits first and second satellite broadcast signals 108a, 108b to each of the first and second SDARS satellites 110, 113, employing the first and second satellite uplink antennas 106a, 106b, respectively. Each of the first and second satellite broadcast signals 108a, 108b contains a collection of separate channels or clusters available for selection by the subscriber. The first and second satellite broadcast signals 108a, 108b are then transmitted to the broadcast retransmisson system 125 as separate time-division multiplexed quadrature phase shift keyed (TDM-QPSK) signals 112, 115 employing the first and second satellite antennas 111, 114, respectively.

In parallel with these TDM-QPSK satellite transmissions, the SDARS broadcast studio 102, the VSAT satellite 116 and the terrestrial repeater 120 cooperate to provide first, second and third terrestrial broadcast signals 109, 118, 124, respectively. These terrestrial broadcast signals employ a coded orthogonal frequency division multiplex (OFDM) frequency structure that provides a stronger, but shorter-ranged version of the TDM-QPSK signals 112, 115. As shown, the terrestrial repeater 120 employs the second terrestrial broadcast signal 118 from the VSAT satellite 116 to provide the third terrestrial broadcast signal 124. The VSAT downlink antenna 121 receives the second terrestrial broadcast signal 118 wherein the repeater signal conditioner 122 conditions it for delivery and transmission by the terrestrial repeater antenna 123.

The broadcast retransmission system 125 includes a broadcast receiver 130 and a broadcast retransmitter 135 that employs the first and second client stations 140, 145. The broadcast receiver 130 consists of the RF/IF and digital front-ends associated with a SDARS receiver and employs a satellite signal antenna 131a for receiving TDM-QPSK signals and a repeater signal antenna 131b for receiving coded OFDM signals. The broadcast receiver 130 provides a broadcast bitstream 132, containing the broadcast, to the broadcast retransmitter 135 that is an optimal quality combination of the received satellite and repeater signals. The broadcast retransmitter 135 includes a gateway 137 that receives the broadcast bitstream 132 and generates a formatted bitstream 138 for retransmission over a wireless local area network (WLAN). A wireless access point 139, which is associated with the WLAN and coupled to the gateway 137, receives and converts the formatted bitstream 138 into a wireless transmission over the WLAN. The first and second client stations 140, 145 are part of the WLAN and allow a user to receive the broadcast.

In the illustrated embodiment, the WLAN conforms to an IEEE 802.11 standard. Correspondingly, the gateway 137 formats the broadcast bitstream 132 according to a format selected from the group consisting of Ethernet, IEEE 1394 (also known as FireWire and i.Link), universal serial bus (USB) and peripheral component interconnect (PCI). The broadcast retransmitter 135 may employ a formatted bitstream that includes a plurality of channels thereby allowing subsequent selection of a single channel. Alternatively, the broadcast retransmitter 135 may employ a channel selector between the broadcast receiver 130 and the gateway 137 wherein the formatted bitstream consists of a single selected channel. In either case, the SDARS 100 affords a "SDARS over WLAN" capability that is transparent to the SDARS broadcast without compromising the security of a subscription-based service, which may be provided by either individual users or by a site license for all users.

In a residence or office, a central broadcast retransmission system may service a plurality of client stations wherein each user/subscriber can select their own preferred programming. In hotels, airports or shopping malls, a user/subscriber can employ a rented client station and receive the SDARS service while staying at the hotel, waiting for flights or shopping. Similarly while traveling by train, airplane, ship or bus, a user/subscriber can also employ a rented client station to receive the SDARS service while in transit. Alternatively, a user/subscriber may employ a personal client station that is appropriate for some or all of the applications discussed above.

Figure 2:
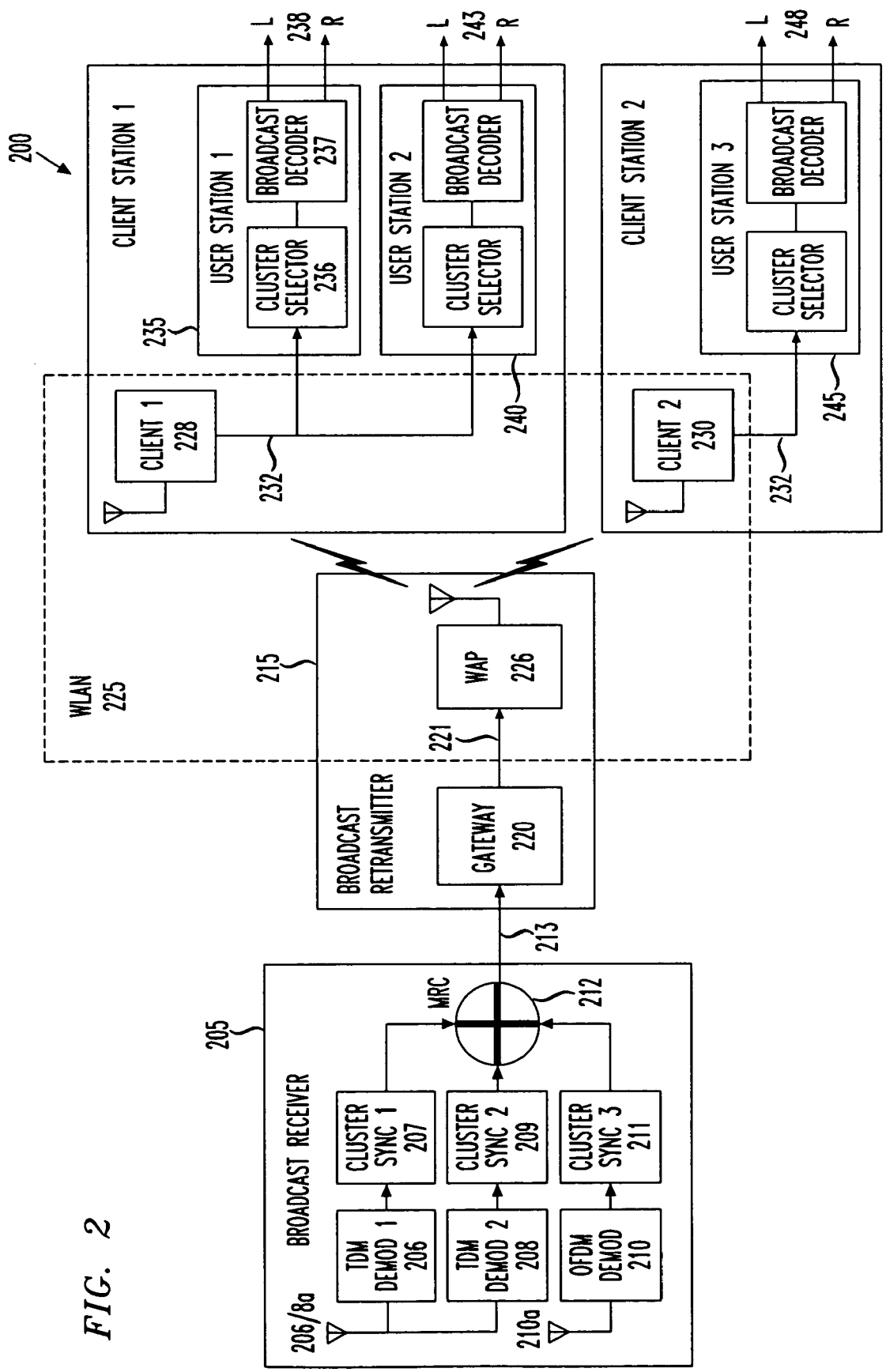
FIG. 2 illustrates a system diagram of a broadcast retransmission system employing an embodiment of a broadcast retransmitter constructed in accordance with the principles of the present invention.

Turning now to FIG. 2, illustrated is a system diagram of a broadcast retransmission system, generally designated 200, employing an embodiment of a broadcast retransmitter constructed in accordance with the principles of the present invention. The broadcast retransmission system 200 includes a broadcast receiver 205 and a broadcast retransmitter 215 having a gateway 220 and a wireless access point (WAP) 226 that provides a multichannel broadcast employing a plurality of channels. The WAP 226 is part of a WLAN 225 that also employs a first WLAN client 228 coupled to first and second user stations 235, 240, and a second WLAN client 230 coupled to a third user station 245. The first, second and third user stations 235, 240, 245 provide stereo audio output signals 238, 243, 248, respectively. Although the WLAN 225 conforms to an IEEE 802.11 standard in the illustrated embodiment, employing other current or future-defined WLAN standards are well within the broad scope of the present invention.

The broadcast receiver 205 includes first and second TDM demodulators 206, 208 coupled to first and second cluster synchronizers 207, 209, respectively. The broadcast receiver 205 also includes an OFDM demodulator 210 coupled to a third cluster synchronizer 211, and a maximal ratio combiner (MRC) 212, coupled to the first, second and third cluster synchronizers 207, 209, 211. The MRC 212 provides a broadcast bitstream 213 to the retransmission system 215. The first and second TDM demodulators 206, 208 receive satellite broadcasts employing a common satellite antenna 206/8a. Similarly, the OFDM demodulator 210 receives a terrestrial repeater broadcast employing an OFDM antenna 210a. Although the broadcast receiver 205 is employed as a satellite-based transmission receiver in the present embodiment, in other applications it may be reconfigured to employ a terrestrial-based transmission and operate as a terrestrial receiver for retransmission within the WLAN 225.

In the broadcast retransmitter 215, the gateway 220 receives the broadcast bitstream 213 and provides a formatted bitstream 221 for wireless transmission between the WAP 226 and the first and second WLAN clients 228, 230. In the illustrated embodiment, the formatted bitstream 221 includes a plurality of channels or clusters wherein a different one may be subsequently selected by each of the user stations 235, 240, 245. Additionally, the formatted bitstream 221 employs a bit rate of about 7.5 megabits per second (Mbps), which may be accommodated in the 54 Mbps capability of the WLAN 225. The formatted bitstream 221 is buffered, segmented and framed as required by the WAP 226.

The gateway 220 formats the broadcast bitstream 213 according to a USB format. In alternative embodiments, the gateway 220 may employ formats associated with Ethernet, IEEE 1394 or PCI as appropriate to a particular application. The gateway 220 also assembles data into packets employing the IEEE 802.11 MAC (Medium Access Control) formats. A reconstructed broadcast bitstream 232 is provided by each of the WLAN clients 228, 230 to their respective user stations 235, 240, 245. Each of the user stations 235, 240, 245 contains similar component sub-systems that are employed to process the broadcast in a similar manner.

For example, the first user station 235 includes a cluster selector 236 and a broadcast decoder 237 that provides the stereo audio output signal 238. The cluster selector 236 provides selection of a specific broadcast channel or cluster for presentation to the broadcast decoder 237. The broadcast decoder 237 then provides decryption, forward error correction decoding, audio selection/decoding and a digital audio processor to provide the selected audio as the first stereo audio output signal 238. Subscription security may be maintained by either individual users or by a site license for all users.

The broadcast retransmission system 200 may provide acceptable audio quality as long as the total error rate of the 7.5 Mbps formatted bitstream 221 is lower than about seven percent, regardless of the distance between the WAP 226 and a client. A seven percent total error rate may be an approximate upper limit for a pre-forward error correction bit error rate. Additionally, since the 7.5 Mbps formatted bitstream 221 includes strong concatenated channel coding (Reed-Solomon or convolution), the WLAN 225 may have to provide little or no protection against errors.

Figure 3:
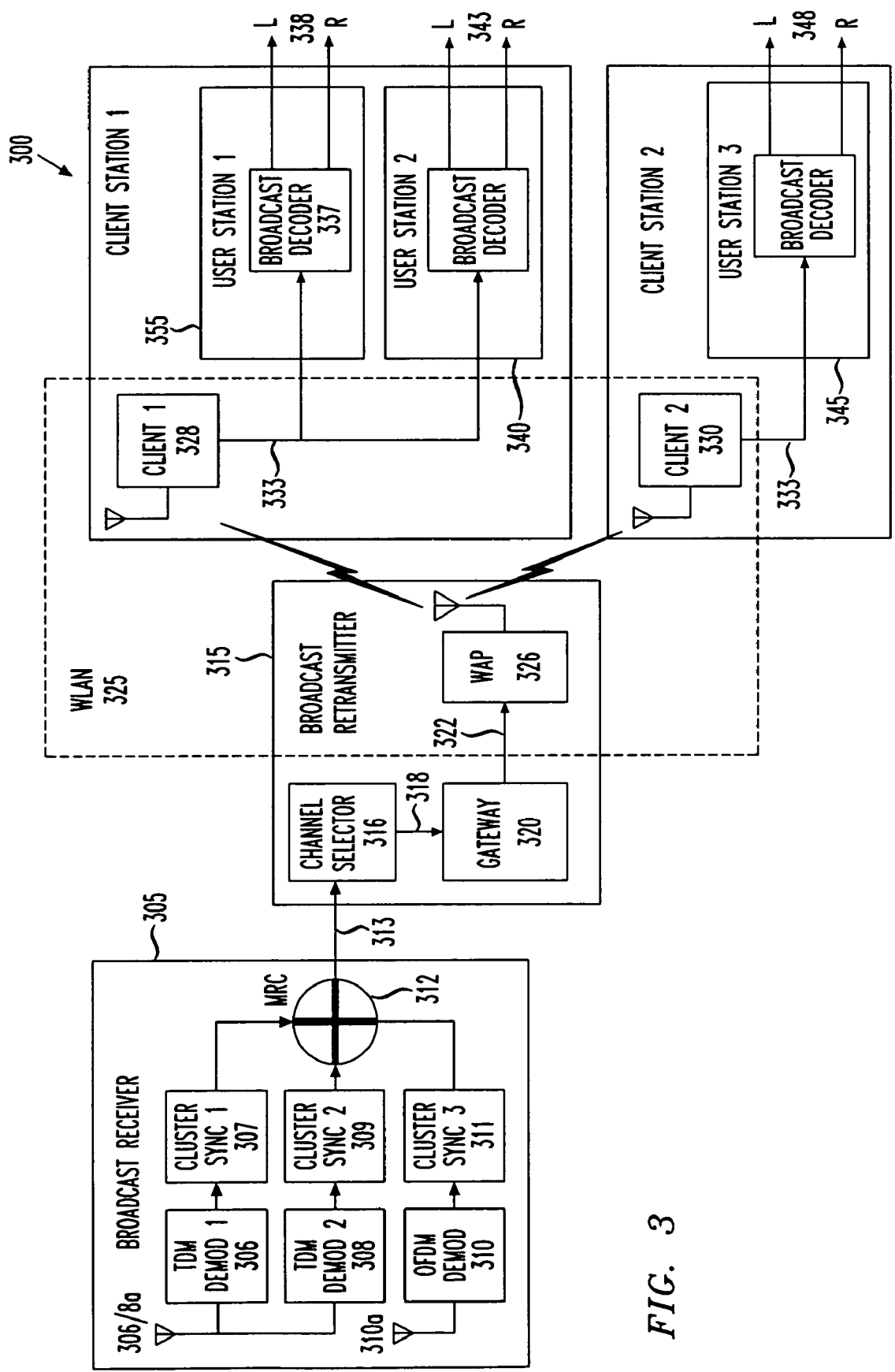
FIG. 3 illustrates a system diagram of another broadcast retransmission system employing an alternative embodiment of a broadcast retransmitter constructed in accordance with the principles of the present invention.

Turning now to FIG. 3, illustrated is a system diagram of another broadcast retransmission system, generally designated 300, employing an alternative embodiment of a broadcast retransmitter constructed in accordance with the principles of the present invention. The broadcast retransmission system 300 includes a broadcast receiver 305 and a broadcast retransmitter 315 having a channel selector 316, a gateway 320 and a WAP 326 that provides a selected single broadcast channel. In the illustrated embodiment, the channel selector 316 interposes the broadcast receiver 305 and the gateway 320. The WAP 326 is part of a WLAN 325 that also employs a first WLAN client 328 coupled to first and second user stations 335, 340, and a second WLAN client 330 coupled to a third user station 345. The first, second and third user stations 335, 340, 345 provide stereo audio output signals 338, 343, 348, respectively.

General operation of the broadcast receiver 305 is analogous to the broadcast receiver 205 of FIG. 2 and includes first and second TDM demodulators 306, 308 that employ a common satellite antenna 306/8a and are coupled to first and second cluster synchronizers 307, 309, respectively. The broadcast receiver 305 also includes an OFDM demodulator 310 that employs an OFDM antenna 310a and is coupled to a third cluster synchronizer 311. The broadcast receiver 305 further includes a maximal ratio combiner (MRC) 312 that is coupled to the first, second and third cluster synchronizers 307, 309, 311 and provides a broadcast bitstream 313 to the broadcast retransmitter 315.

In this embodiment of the broadcast retransmitter 315, the channel selector 316 receives the broadcast bitstream 313 that is multi-channel and selects a single channel or cluster to provide a channel bitstream 318 having only the single selected channel. In an alternative embodiment, the channel selector 316 cooperates with the first, second and third cluster synchronizers 307, 309, 311 to select the single channel in the broadcast receiver 305 thereby lowering the bit rate of the broadcast bitstream 313. The bit rate of the channel bitstream 318 is about 880 kilobits per second, which is significantly lower than the 7.5 Mbps bit rate of the broadcast bitstream 213 as was discussed with respect to FIG. 2.

The gateway 320 receives the channel bitstream 318 and provides a formatted bitstream 322 for wireless transmission between the WAP 326 and the first and second WLAN clients 328, 330. A reconstructed channel bitstream 333 is provided by each of the first and second WLAN clients 328, 330 to their respective user stations 335, 340, 345. As before, each of the user stations 335, 340, 345 may contain similar component sub-systems that process the broadcast in a similar manner. Since the reconstructed channel bitstream 333 contains only the single selected channel, the first user station 335 may employ only a broadcast decoder 337 to provide the stereo audio output signal 338, for example. Subscription security may be again maintained by either individual users or by a site license for all users. If the broadcast retransmission system 300 requires additional error protection, automatic repeat request or forward error correction functions may be applied to provide reliable audio quality.

Figure 4:
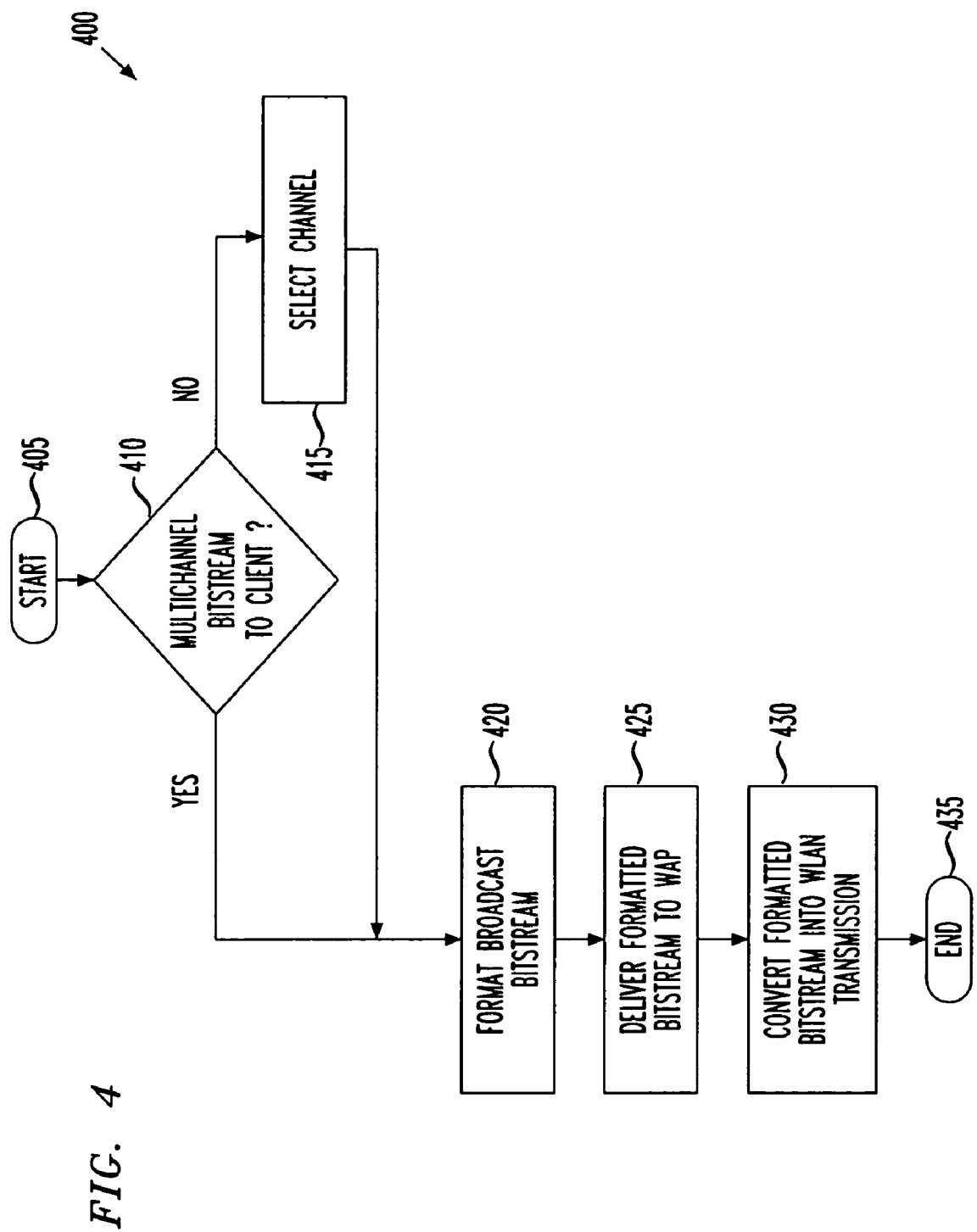
FIG. 4 illustrates a flow diagram of an embodiment of a method of retransmitting a broadcast over a wireless local area network (WLAN) carried out in accordance with the principles of the present invention.

Turning now to FIG. 4, illustrated is a flow diagram of an embodiment of a method of retransmitting a broadcast over a wireless local area network (WLAN), generally designated 400, carried out in accordance with the principles of the present invention. The method 400 starts in a step 405 wherein a broadcast bitstream is provided that is to be retransmitted employing the WLAN. In a decisional step 410, it is determined if the broadcast bitstream provided to a WLAN client station of the WLAN is a multichannel broadcast bitstream thereby allowing a plurality of client station users to select differing channels from the broadcast. If the multichannel broadcast bitstream is provided, it is formatted for retransmission in a step 420. Then, in a step 425, the formatted multichanel bitstream is delivered to a wireless access point (WAP) of the WLAN and is converted into a WLAN transmission in a step 430 the method 400 ends in a step 435.

If a single selected channel is provided in the first decisional step 410, then a single channel broadcast bitstream is selected from the multichannel broadcast bitstream for retransmission in a step 415. The single channel broadcast bitstream selected in the step 415 typically employs a lower bit rate and is formatted, delivered and converted for WLAN transmission in the steps 420, 425, 430, respectively. Again, the method 400 ends in the step 435.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of the present invention employing a broadcast retransmitter, method of retransmitting a broadcast and a system employing the retransmitter and method have been presented. Advantages include providing user services that include compact disk quality audio from a source such as SDARS over a WLAN. Additionally, other satellite or terrestrial based services may employ retransmission over the WLAN. These services may be provided in environments that include residences, offices, hotels, airports and shopping malls and may be provided over existing generic WLANs that are typically cost effective. Security for subscription services may be maintained by individual users or by employing site licences.

Although the present invention has been described in detail, those skilled in the art should understand that they can make various changes, substitutions and alterations herein without departing from the spirit and scope of the invention in its broadest form.

What is claimed is:

1. A broadcast retransmitter for use with a wireless local area network (WLAN), comprising:
    a gateway configured to format a bitstream received from a broadcast receiver, said bitstream including an aggregate signal resulting from a combination of a plurality of diversity signals, at least one signal of said plurality of diversity signals received from a satellite, for:
        delivery to a wireless access point (WAP) of said WLAN; and
        subsequent conversion by said WAP into a wireless transmission over said WLAN to make said bitstream available for reception by a client of said WLAN.

2. The retransmitter as recited in claim 1 wherein said broadcast receiver comprises a terrestrial receiver.

3. The retransmitter as recited in claim 1 wherein said gateway formats said bitstream according to a format selected from the group consisting of:
    Ethernet,
    IEEE 1394,
    USB, and
    PCI.

4. The retransmitter as recited in claim 1 wherein said WLAN conforms to an IEEE 802.11 standard.

5. The retransmitter as recited in claim 1 wherein said bitstream includes a plurality of channels and a channel is subsequently selected therefrom.

6. The retransmitter as recited in claim 1 further comprising a channel selector interposing said broadcast receiver and said gateway, said bitstream including a selected channel.

7. The broadcast retransmitter of claim 1, wherein said aggregate signal is generated by a maximal ratio combiner.

8. The broadcast retransmitter of claim 1, wherein said diverse signals are redundant signals.

9. A method of retransmitting a broadcast over a wireless local area network (WLAN), comprising:
    formatting a bitstream received from a broadcast receiver and containing said broadcast, and including an aggregate signal resulting from a combination of a plurality of diverse signals, at least one signal of said plurality of diverse signals received from a satellite;
    delivering said bitstream to a wireless access point of said WLAN; and
    converting said bitstream into a wireless transmission over said WLAN to make said bitstream available for reception by a client of said WLAN.

10. The method as recited in claim 9 wherein said broadcast receiver comprises a terrestrial receiver.

11. The method as recited in claim 9 wherein said gateway formats said bitstream according to a format selected from the group consisting of:
    Ethernet,
    IEEE 1394,
    USB, and
    PCI, and wherein said WLAN conforms to an IEEE 802.11 standard.

12. The method as recited in claim 9 wherein said bitstream includes a plurality of channels and a channel is subsequently selected therefrom.

13. The method as recited in claim 9 further comprising a channel selector interposing said broadcast receiver and said gateway, said bitstream including a selected channel.

14. A broadcast retransmission system, comprising:
    a broadcast receiver that receives a broadcast and generates a bitstream containing said broadcast;
    a gateway, coupled to said broadcast receiver, that generates a formatted bitstream for retransmission, that includes an aggregate signal resulting from a combination of a plurality of diversity signals, at least one signal of said plurality of signals received from a satellite;
    a wireless access point, coupled to said gateway, that receives and converts said formatted bitstream into a wireless transmission over a wireless local area network (WLAN) to make said bitstream available for reception by a client of said WLAN.

15. The system as recited in claim 14 wherein said broadcast receiver comprises a terrestrial receiver.

16. The system as recited in claim 14 wherein said gateway formats said bitstream according to a format selected from the group consisting of:
    Ethernet,
    IEEE 1394,
    USB, and
    PCI.

17. The system as recited in claim 14 wherein said WLAN conforms to an IEEE 802.11 standard.

18. The system as recited in claim 14 wherein said bitstream includes a plurality of channels and a channel is subsequently selected therefrom.

19. The system as recited in claim 14 further comprising a channel selector interposing said broadcast receiver and said gateway, said bitstream including a selected channel.

20. The system of claim 14, wherein said premises client includes a consumer premises.

* * * * *